(12) United States Patent  
Rahman

(10) Patent No.: US 8,332,803 B1  
(45) Date of Patent: Dec. 11, 2012

(54) METHOD AND APPARATUS FOR INTEGRATED CIRCUIT PACKAGE THERMO-MECHANICAL RELIABILITY ANALYSIS

(75) Inventor: Arifur Rahman, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 337 days.

(21) Appl. No.: 12/824,542

(22) Filed: Jun. 28, 2010

(51) Int. Cl.
*G06F 17/50* (2006.01)
(52) U.S. Cl. ............ 716/136; 716/52; 716/112; 716/137
(58) Field of Classification Search .................. None
See application file for complete search history.

(56) References Cited

U.S. PATENT DOCUMENTS

| | | | |
|---|---|---|---|
| 6,813,749 B2 * | 11/2004 | Rassaian ........................... 703/7 |
| 6,950,761 B2 * | 9/2005 | Ramanujachar ................ 702/48 |
| 7,543,254 B2 * | 6/2009 | Xu et al. ......................... 716/136 |
| 7,730,444 B2 * | 6/2010 | Itoh et al. ......................... 716/51 |
| 7,945,398 B2 * | 5/2011 | Kobayashi ....................... 702/42 |
| 8,056,027 B2 * | 11/2011 | Dang et al. ....................... 716/55 |
| 2009/0326864 A1 * | 12/2009 | McElfresh et al. ........... 702/179 |

* cited by examiner

*Primary Examiner* — Leigh Garbowski
(74) *Attorney, Agent, or Firm* — Robert M. Brush; LeRoy D. Maunu

(57) ABSTRACT

A method and apparatus for integrated circuit package thermo-mechanical reliability analysis are described. In some examples, a computer-implemented method of modeling stress in a packaged semiconductor device includes: selecting, using a computer, successive portions of a package layout for the semiconductor device, each of the successive portions of the package layout describing physical layout of at least one interconnect structure in the semiconductor device; for each portion of the successive portions of the package layout: (1) selecting a pre-defined layout from a library of pre-defined layouts based on the portion of the package layout; (2) obtaining pre-characterization information for the pre-defined layout that defines structural properties of the pre-defined layout; and (3) executing a modeling algorithm to determine a stress measurement for the portion of the package layout using the pre-characterization information as parametric input; and combining stress measurements for each of the successive portions of the package layout to determine a stress profile for the semiconductor device.

20 Claims, 3 Drawing Sheets

US 8,332,803 B1

METHOD AND APPARATUS FOR INTEGRATED CIRCUIT PACKAGE THERMO-MECHANICAL RELIABILITY ANALYSIS

FIELD OF THE INVENTION

One or more aspects of the present invention relate generally to computer-aided integrated circuit design and, more particularly, to a method and apparatus for integrated circuit package thermo-mechanical reliability analysis.

BACKGROUND

As semiconductor technology has advanced, the amount and speed of logic available on an IC, such as a field programmable gate array (FPGA), has increased more rapidly than the number and performance of I/O connections. As a result, IC die stacking techniques have received renewed interest to address the interconnection bottleneck of high-performance systems (also referred to as three-dimensional (3D) ICs). In 3D IC applications, two or more IC devices and/or substrates are stacked vertically and interconnections are made between them. Exemplary stacked arrangements include a mother IC and one or more daughter ICs stacked thereon, such as an FPGA mother IC with one or more memory daughter ICs; or a plurality of ICs stacked on an interposing substrate, such multiple FPGAs and/or other ICs (e.g., RAM) mounted side-by-side on an interposing substrate.

In stacked arrangements, ICs are typically mounted to other ICs/substrates using relatively small solder bumps ("micro-bumps"). Such micro-bumps are small relative to the conventional C4 bumps using in IC packaging. Through substrate vias (TSVs) (also referred to as through die vias (TDVs)) can be employed to establish interconnections between stacked ICs/substrates. A TSV is a metal via that extends through a substrate for coupling to another substrate that is vertically stacked on the substrate. Further, stacked IC/substrate arrangements can be packaged in a single package having a plurality of C4 bumps or like type IC terminals.

In conventional flip-chip packages, C4 bumps that encounter the highest thermal and/or mechanical stress ("thermo-mechanical stress") are well known. Such high-stress bumps are typically located in the corner and/or edge of the IC substrate. Thermo-mechanical finite element modeling (FEM) of chip-package corners and edges can be used to provide a package-level stress analysis. Such modeling can take a day to many days to complete using present-day computers and workstations. In a 3D IC with many micro-bumps and TSVs, thermo-mechanical stress depends on many factors, including die location, location of micro-bumps with respect to TSVs, local temperature, back end of line (BEOL) metallization and dielectric configuration, material composition, die/interposer thickness, and the like. Also, the number of micro-bumps in a typical 3D IC is 10 to 1000 times higher than the number of C4 bumps in a conventional flip-chip package. Thus, thermo-mechanical modeling of a 3D IC using conventional processes can be impractical in terms of the time to perform such modeling, particularly given the complexity of 3D ICs compared to conventional IC packages.

Accordingly, there exists a need in the art for a method and apparatus for integrated circuit package thermo-mechanical reliability analysis that overcomes the aforementioned disadvantages.

SUMMARY

Embodiments relate to a computer-implemented method, and non-transitory computer readable medium having software executable to perform a method, of modeling stress in a packaged semiconductor device. The method can include: selecting, using a computer, successive portions of a package layout for the semiconductor device, each of the successive portions of the package layout describing physical layout of at least one interconnect structure in the semiconductor device; for each portion of the successive portions of the package layout: (1) selecting a pre-defined layout from a library of pre-defined layouts based on the portion of the package layout; (2) obtaining pre-characterization information for the pre-defined layout that defines structural properties of the pre-defined layout; and (3) executing a modeling algorithm to determine a stress measurement for the portion of the package layout using the pre-characterization information as parametric input; and combining stress measurements for the successive portions of the package layout to determine a stress profile for the semiconductor device.

In some embodiments of the method and computer readable medium, the at least one interconnect structure in each of the successive portions of the package layout can include at least one of: (1) at least one micro-bump; or (2) at least one through-silicon via (TSV). The pre-characterization information can include a mesh defining structure of the pre-defined layout. The modeling algorithm can comprise a finite element analysis algorithm configured to use the mesh to determine stress. The method can further include: analyzing the stress profile to determine a ranking of interconnect structures in the package layout according to stress; and displaying a graphic user interface (GUI) illustrating the ranking. The method can further include highlighting, within the GUI, at least one interconnect structure in the package layout where stress as determined in the stress profile exceeds a pre-defined threshold. The method can further include executing an optimization algorithm using the stress profile as parametric input to modify the package layout. The optimization algorithm can comprise a simulated annealing algorithm.

Another embodiment relates to an apparatus for modeling stress in a packaged semiconductor device. The apparatus can include: means for selecting, using a computer, successive portions of a package layout for the semiconductor device, each of the successive portions of the package layout describing physical layout of at least one interconnect structure in the semiconductor device; means for selecting a pre-defined layout from a library of pre-defined layouts based on each of the successive portions of the package layout; means for obtaining pre-characterization information for the pre-defined layout selected for each of the successive portions of the package layout that defines structural properties of the pre-defined layout; means for executing a modeling algorithm to determine a stress measurement for each successive portion of the package layout using the respective pre-characterization information as parametric input; and means for combining stress measurements for the successive portions of the package layout to determine a stress profile for the semiconductor device.

In some embodiments of the apparatus, the at least one interconnect structure in each of the successive portions of the package layout can include at least one of: (1) at least one micro-bump; or (2) at least one through-silicon via (TSV). The pre-characterization information can include a mesh defining structure of the pre-defined layout, and wherein the modeling algorithm comprises a finite element analysis algorithm configured to use the mesh to determine stress. The apparatus can further include: means for analyzing the stress profile to determine a ranking of interconnect structures in the package layout according to stress; and means for displaying a graphic user interface (GUI) illustrating the ranking. The apparatus can further include means for highlighting, within the GUI, at least one interconnect structure in the package layout where stress as determined in the stress profile exceeds a pre-defined threshold. The apparatus can further include means for executing an optimization algorithm using the stress profile as parametric input to modify the package layout. The optimization algorithm can comprise a simulated annealing algorithm.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION

Method and apparatus for integrated circuit package thermo-mechanical reliability analysis is described. Embodiments of an analysis tool provide a fast and automated thermo-mechanical stress analysis that can compute and rank interconnect structures (e.g., micro-bumps, through silicon vias, etc.) based on their stress profile. Further, the analysis tool can provide layout solutions to mitigate thermo-mechanical stress in the package layout for a semiconductor device. Embodiments of the analysis tool are implemented as a computer aided design (CAD) software tool executing on a computer. Embodiments of the analysis tool can improve design productivity by shortening thermo-mechanical stress analysis time, identifying potential mechanical weakness in three-dimensional semiconductor devices, and providing layout guidance to improve the package layout.

Figure 1:
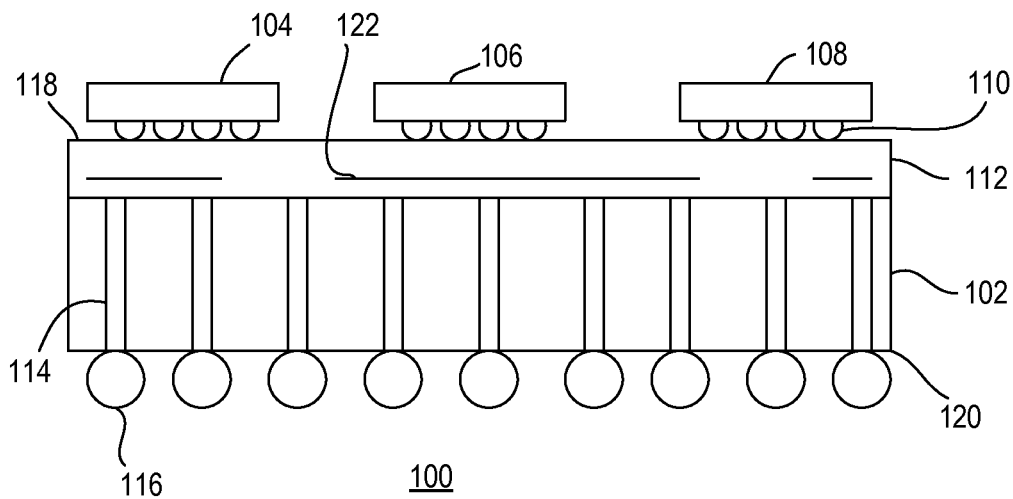
FIG. 1 depicts an exemplary three dimensional semiconductor device.

FIG. 1 depicts an exemplary three dimensional semiconductor device 100. The device 100 includes integrated circuit (IC) devices 104, 106, and 108 mounted on an interposer substrate 102. The interposer substrate 102 includes a front side 120 and a backside 118. Conductive interconnect 112 is formed on the backside 118 of the interposer substrate 102. Each of the IC devices 104, 106, and 108 includes a semiconductor die 109 and external contacts referred to as micro-bumps 110. The IC devices 104, 106, and 108 are electrically and mechanically mounted to the interposer substrate 102. In particular, the micro-bumps 110 of each of the IC devices 104, 106, and 108 are electrically and mechanically bonded to portions of the interconnect 112. The interconnect 112 includes one or more conductive layers of metal lines 122. The interposer substrate 102 further includes through silicon vias (TSVs) 114 that extend between the backside 118 and the front side 120. The TSVs 114 electrically connect portions of the interconnect 112 to solder bumps 116 on the front side 120 of the interposer substrate 102. The solder bumps 116 can be reflowed to electrically and mechanically couple the semiconductor device 100 to another device, such as a printed circuit board (PCB) or the like using, for example the C4 process. The IC devices 104, 106, and 108 can be electrically coupled to one another through the interconnect 112. Further, some micro-bumps 110 can be electrically coupled to some bumps 116 through portions of the interconnect 112 and some of the TSVs 114.

Structures used to electrically couple the IC devices 104, 106, and 108 to the bumps 116 are generally referred to herein as interconnect structures. Interconnect structures can include the micro-bumps 110, the interconnect 112, and the TSVs 114. The specific physical arrangement of the interconnect structures is referred to as a package layout for the semiconductor device 100. For example, as shown in FIG. 1, the physical layout includes the micro-bumps 110 electrically and mechanically coupled to portions of the interconnect 112, which in turn is electrically and mechanically coupled to the TSVs 112, which in turn are electrically and mechanically coupled to the bumps 116. As is known in the art, mechanical couplings are subject to mechanical stress. Further, electrical couplings can generate heat due to electric current, which in turn produces thermal stress on the interconnect structures. Thermal stress can in turn further contribute to mechanical stress. Thus, stress for the semiconductor device 100 given a particular package layout can be referred to as thermo-mechanical stress. In general, an interconnect structure can be affected by mechanical stress, thermal stress, or both. In particular, stress encountered by the micro-bumps 110 can depend on several factors, including location of the IC device on the interposer substrate, location of the micro-bumps with respect to the TSVs, local temperature, material composition, thickness of the IC die and/or interposer substrate, and the like.

Figure 2:
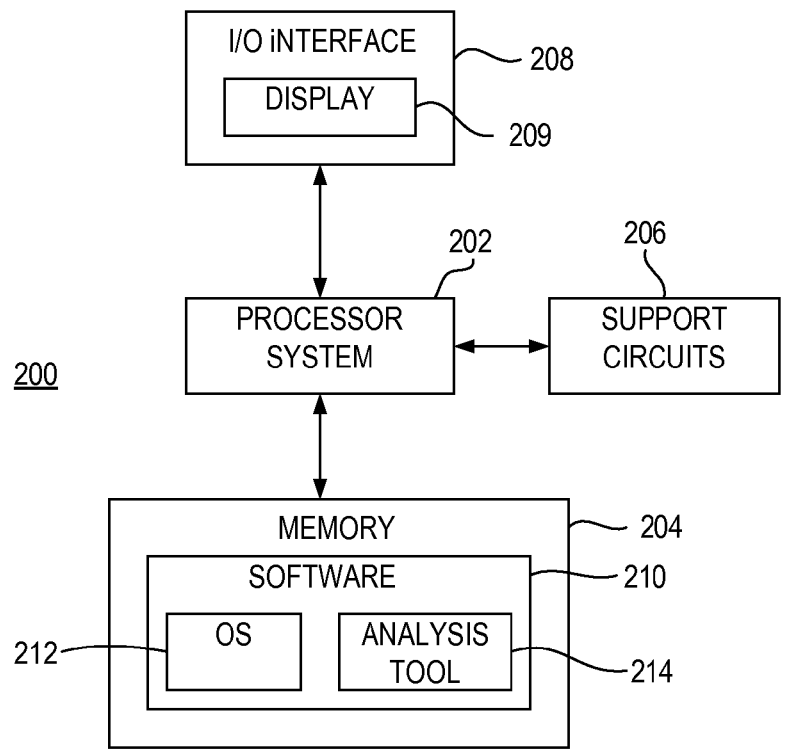
FIG. 2 is a block diagram depicting exemplary embodiments of a computing system.

FIG. 2 is a block diagram depicting exemplary embodiments of a computing system 200. The computing system 200 includes a processor system 202, a memory 204, various support circuits 206, and an I/O interface 208. In general, the processor system 202 may include one or more processors. A processor includes a circuit configured to execute program instructions. A processor may also be referred to as a central processing unit (CPU). Processor(s) in the processor system 202 can be implemented using one or microprocessors, each of which can include one or more independent cores. The support circuits 206 for the processor system 202 include conventional cache, power supplies, clock circuits, data registers, I/O interfaces, and the like. The I/O interface 208 may be directly coupled to the memory 204 or coupled through the processor system 202. The I/O interface 208 can include a display 109. The memory 204 may include one or more of the following random access memory, read only memory, magneto-resistive read/write memory, optical read/write memory, cache memory, magnetic read/write memory, and the like.

The memory 204 stores software 210 that includes program instructions configured for execution by the processing system 202. The software 210 can include an operating system (OS) 212 and an analysis tool 214. The OS 112 can provide an interface between the analysis tool 214 and the computing system 200. The OS 112 may be implemented using various operating systems known in the art. The analysis tool 214 can be executed by the processor system 202 under control of the OS 112 to perform thermo-mechanical reliability analysis, as described in detail below.

Figure 3:
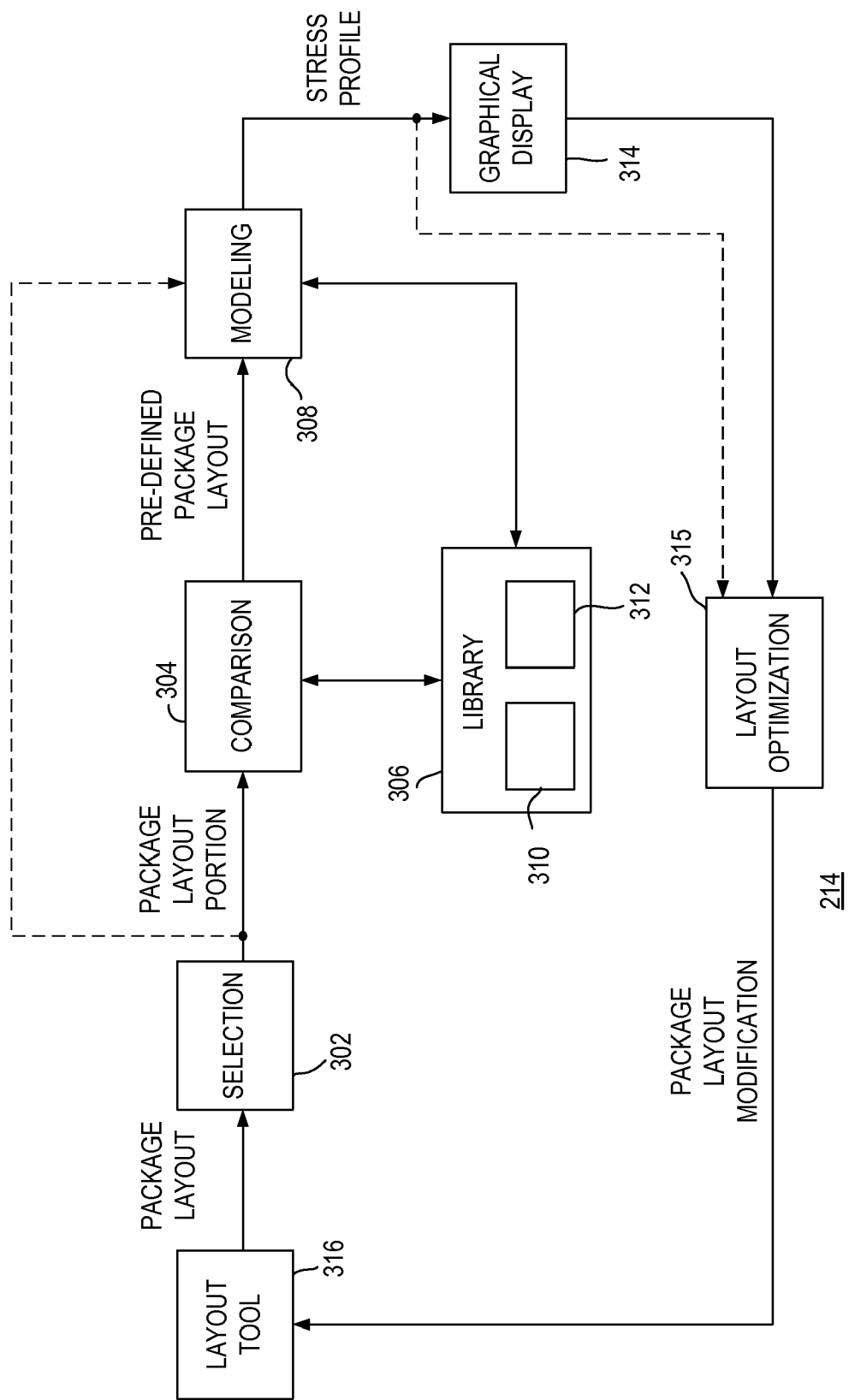
FIG. 3 is a block diagram depicting an exemplary embodiment of the analysis tool.

FIG. 3 is a block diagram depicting an exemplary embodiment of the analysis tool 214. In an embodiment, the analysis tool 214 can include a selection module 302, a comparison module 304, a library module 306, and a modeling module 308. The selection module 302 is configured to receive a description of the package layout for a semiconductor device. The package layout describes the arrangement of interconnect elements, such as micro-bumps and TSVs, in the semiconductor device. The selection module 302 is configured to select a portion of the package layout. A portion of the package layout can describe the physical layout of at least one interconnect structure (e.g., at least one micro-bump and/or at least one TSV). The selection module 302 provides successive portions of the package layout as output to the comparison module 304. Thus, the selection module 302 can implement a sliding window across the package layout, where a portion of the package layout is selected for each window.

The comparison module 304 is configured to receive portions of the package layout. The comparison module 304 is also coupled to the library module 306. The library module 306 stores a plurality of pre-defined layouts 310. For each portion of the package layout received from the selection module 302, the comparison module 304 queries the library module 306 to determine which one of the pre-defined layouts 310 is a best match. Various criteria can be employed to determine the best match, including the number and type of interconnect elements, the physical position of the interconnect elements, the composition and material of the interconnect elements, and the like. The various criteria can be combined in any desired manner to determine a metric indicative of the degree of match between the given portion of the package layout and a pre-defined package layout.

The comparison module 304 outputs the identity of the best matching pre-defined package layout for each portion of the package layout to the modeling module 308. The modeling module 308 is also coupled to the library module 306. For each of the pre-defined package layouts 310, the library module stores pre-characterization information 312. Pre-characterization information defines structural properties for a given pre-defined layout that can be used by a specific modeling algorithm to determine stress measurements. The modeling module 308 determines stress measurements for the pre-defined package layouts using the pre-characterization information as parametric input.

In some embodiments, the modeling module 308 executes a finite element analysis algorithm to model the pre-defined package layout. A finite element analysis is a computer model of a material or design that is stressed and analyzed for specific results. Finite element analysis uses a system of points called nodes that make a grid called a mesh. The mesh is programmed to contain the material and structural properties that define how the structure will react to certain loading conditions. The pre-characterization information for a given pre-defined package layout can include a mesh model for use in finite element analysis. Thus, the modeling module 308 is not required to create the mesh model each time a given package layout is processed, which can accelerate the entire stress modeling process. Finite element analysis also includes various objective functions available for minimization or maximization, including mass, volume, and temperature functions, strain energy and stress strain functions, force, displacement, velocity, and acceleration functions, and the like. In some embodiments, the pre-characterization information can include particular optimal minimizations/maximizations for one or more objective functions, obviating the need for such functions to be optimized by the modeling module 308. Those skilled in the art will appreciate that other types of information related to finite element analysis can be predetermined given a known package layout (e.g., the pre-defined package layouts 310) and can be provided as part of the pre-characterization information. In general, the pre-characterization information accelerates the modeling process performed by the modeling module 308. It is to be understood that the modeling module 308 can employ other types of modeling algorithms, such as analytical modeling that can also employ different types of pre-characterization information to accelerate the modeling process. The pre-characterization information is capable of being produced ahead of time given particular pre-defined package layouts and can thus accelerate the modeling process given a particular package layout being analyzed.

The modeling module 308 produces a stress measurement for each pre-defined package layout identified by the comparison module 304. The stress measurement can include various mechanical, thermal, and the like stress measurements for the various interconnect elements in the pre-defined package layout. The modeling module 308 can combine the stress measurements for each of the successive pre-defined package layouts to determine a package stress profile for the semiconductor device.

In the above embodiments, it is assumed the portion of the package layout and the corresponding pre-defined package layout are the same or that the stress modeling of the pre-defined package layout is sufficient for the portion of the package layout. In some embodiments, the modeling module 308 can receive the portion of the package layout as selected by the selection module 302, as well as the corresponding pre-defined package layout from the library 306. The modeling module 306 can modify the pre-characterization data associated with the pre-defined layout in order to more closely correspond to the actual package layout portion being analyzed. That is, the pre-characterization data can provide a starting point for the modeling, which is then modified to more closely match the actual package layout. The pre-characterization information still accelerates stress modeling as compared to not having such information and constructing the model from without such information.

In some embodiments, the analysis tool 214 further includes a graphical display module 314. The graphical display module 314 can receive the stress profile as determined by the modeling module 308. The graphical display module 314 can then rank the interconnect elements of the semiconductor device based on various associated stress measurements obtained from the stress profile. The graphical display module 314 can generate any type of graphic for display (e.g., on the display 109) to illustrate the ranking to a user. The graphical display module 314 can configure the graphic such that particular interconnect elements are highlighted if associated stress measurements exceed pre-defined thresholds. Thus, a user can quickly identify interconnect elements that will experience excessive stress in the particular package layout for the semiconductor device. The user can then modify the package layout for the semiconductor device and perform the stress analysis again to see the results. Stress analysis and package layout modification can be iterated until all interconnect elements are without stress thresholds. It is to be understood that any type of graphic user interface (GUI) can be used to display the stress ranking produced by the graphical display module 314.

In some embodiments, the analysis tool 214 further includes a layout optimization module 315. The graphical display module 314 can produce as output information indicative of which interconnect elements have stress that exceeds pre-defined thresholds in the package layout. The layout optimization tool 315 can receive such output from the graphical display module 314. The layout optimization tool 315 can also receive the stress profile from the modeling module 308. The layout optimization tool 315 can be further coupled to a layout tool 316 that is configured to produce the package layout being analyzed. The layout optimization tool 315 can instruct the layout tool 316 to modify the package layout, in particular, those interconnect elements that have stress exceeding the defined thresholds. For example, the layout optimization tool 315 can modify the layout of particular micro-bumps (e.g., proximity or overlap with TSVs) to reduce their stress. In some embodiments, the layout optimization tool 315 can execute a simulated annealing algorithm given the stress profile to identify optimal interconnect element placement in the package layout. The package layout can be modified by the layout tool 315, and the stress analysis can be re-run as described above until the package layout satisfies desired stress thresholds.

Figure 4:
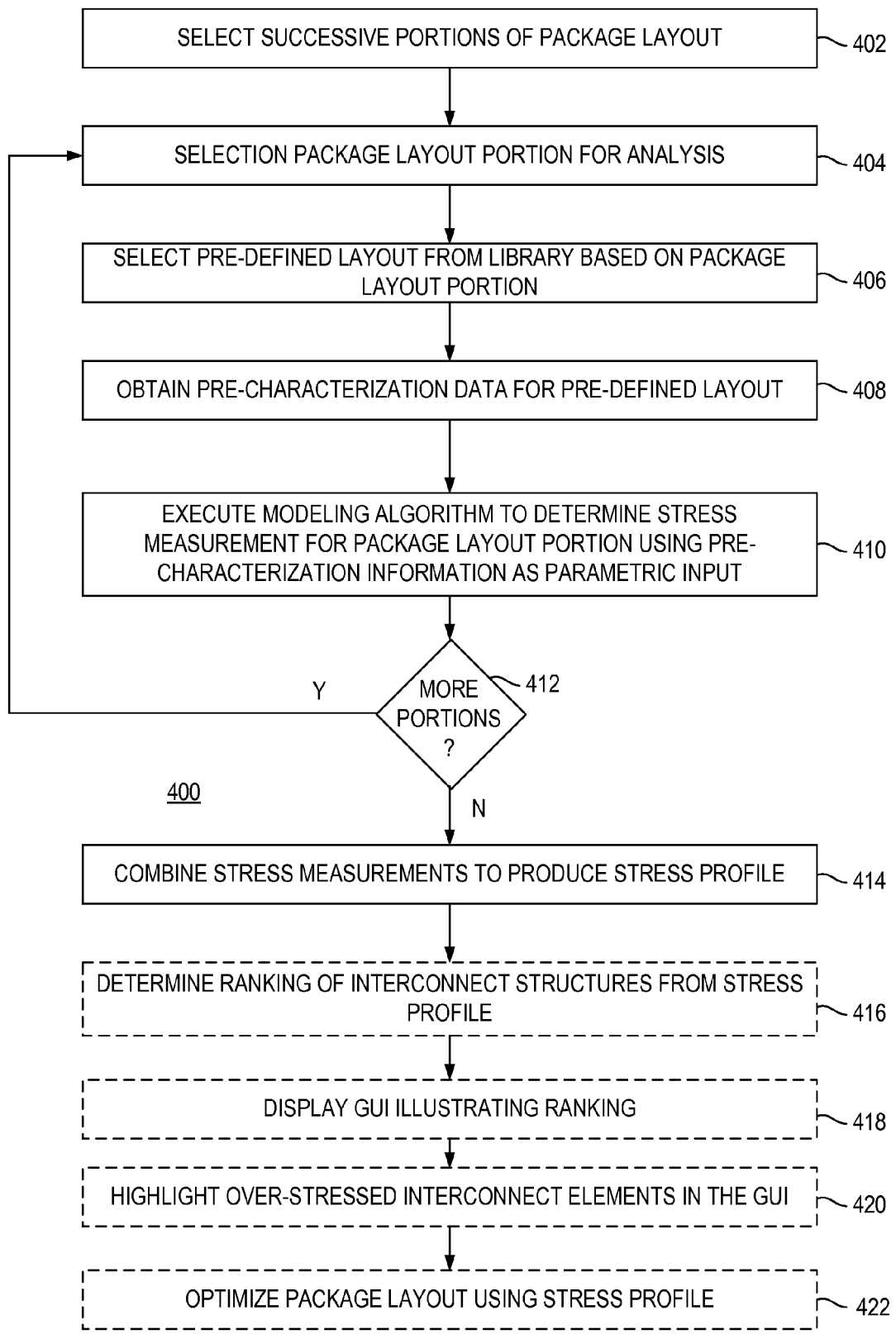
FIG. 4 is a flow diagram depicting an exemplary method of modeling stress in a packaged semiconductor device.

FIG. 4 is a flow diagram depicting an exemplary method 400 of modeling stress in a packaged semiconductor device. The method 400 begins at step 402, where successive portions of a package layout for the semiconductor device are selected. Each of the successive portions of the package layout describe physical layout of at least one interconnect structure in the semiconductor device. At step 404, a particular portion is selected. At step 406, a pre-defined layout is selected from a library of pre-defined layouts based on the package layout portion. At step 408, pre-characterization information is obtained for the pre-defined layout that defines structural properties of the pre-defined layout. At step 410, a modeling algorithm is executed to determine a stress measurement for the package layout portion using the pre-characterization data as parametric input. At step 412, a determination is made whether there are more package layout portions to analyze. If so, the method 400 returns to step 404. Otherwise, the method 400 proceeds to step 414. At step 414, stress measurements for the successive portions of the package layout are combined to determine a stress profile for the semiconductor device.

The method 400 may include steps 416-418. At step 416, the stress profile is analyzed to determine a ranking of interconnect structures in the package layout according to stress. At step 418, a graphic user interface (GUI) is displayed illustrating the ranking. The method 400 may include step 420, where at least one interconnect structure is highlighted with the GUI where stress as determined in the stress profile exceeds a pre-defined threshold.

The method 400 may include a step 422, where an optimization algorithm is executed using the stress profile as parametric input to modify the package layout.

An aspect of the invention is implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While the foregoing describes exemplary embodiments in accordance with one or more aspects of the present invention, other and further embodiments in accordance with the one or more aspects of the present invention may be devised without departing from the scope thereof, which is determined by the claims that follow and equivalents thereof. Claims listing steps do not imply any order of the steps. Trademarks are the property of their respective owners.

What is claimed is:

1. A computer-implemented method of modeling stress in a packaged semiconductor device, comprising:
selecting, using a computer, successive portions of a package layout for the semiconductor device, each of the successive portions of the package layout describing physical layout of at least one interconnect structure in the semiconductor device;
for each portion of the successive portions of the package layout:
(1) selecting a pre-defined layout from a library of pre-defined layouts based on the portion of the package layout, wherein the selecting of the pre-defined layout includes determining the pre-defined layout from the library that matches a number and type of interconnect elements, and a physical position of the interconnect elements of the selected portion;
(2) obtaining, from the library of pre-defined layouts, pre-characterization information for the pre-defined layout that defines structural properties of the pre-defined layout; and
(3) executing a modeling algorithm to determine a stress measurement for the portion of the package layout using the pre-characterization information as parametric input; and
combining stress measurements for the successive portions of the package layout to determine a stress profile for the semiconductor device.

2. The method of claim 1, wherein the at least one interconnect structure in each of the successive portions of the package layout includes at least one of: (1) at least one micro-bump; or (2) at least one through-silicon via (TSV).

3. The method of claim 1, wherein:
the pre-characterization information includes a mesh defining structure of the pre-defined layout; and
the modeling algorithm comprises a finite element analysis algorithm configured to use the mesh to determine stress.

4. The method of claim 1, further comprising:
analyzing the stress profile to determine a ranking of interconnect structures in the package layout according to stress; and
displaying a graphic user interface (GUI) illustrating the ranking.

5. The method of claim 4, further comprising:
highlighting, within the GUI, at least one interconnect structure in the package layout where stress as determined in the stress profile exceeds a pre-defined threshold.

6. The method of claim 1, further comprising:
executing an optimization algorithm using the stress profile as parametric input to modify the package layout.

7. The method of claim 6, wherein the optimization algorithm comprises a simulated annealing algorithm.

8. An apparatus for modeling stress in a packaged semiconductor device, comprising:
means for selecting, using a computer, successive portions of a package layout for the semiconductor device, each of the successive portions of the package layout describing physical layout of at least one interconnect structure in the semiconductor device;
means for selecting a pre-defined layout from a library of pre-defined layouts based on each of the successive portions of the package layout, wherein the means for selecting the pre-defined layout includes means for determining the pre-defined layout from the library that matches a number and type of interconnect elements, and a physical position of the interconnect elements of the selected portion;

means for obtaining, from the library of pre-defined layouts, pre-characterization information for the pre-defined layout selected for each of the successive portions of the package layout that defines structural properties of the pre-defined layout;

means for executing a modeling algorithm to determine a stress measurement for each successive portion of the package layout using the respective pre-characterization information as parametric input; and means for combining stress measurements for the successive portions of the package layout to determine a stress profile for the semiconductor device.

9. The apparatus of claim 8, wherein the at least one interconnect structure in each of the successive portions of the package layout includes at least one of: (1) at least one micro-bump; or (2) at least one through-silicon via (TSV).

10. The apparatus of claim 8, wherein:

the pre-characterization information includes a mesh defining structure of the pre-defined layout; and the modeling algorithm comprises a finite element analysis algorithm configured to use the mesh to determine stress.

11. The apparatus of claim 8, further comprising:

means for analyzing the stress profile to determine a ranking of interconnect structures in the package layout according to stress; and means for displaying a graphic user interface (GUI) illustrating the ranking.

12. The apparatus of claim 11, further comprising:

means for highlighting, within the GUI, at least one interconnect structure in the package layout where stress as determined in the stress profile exceeds a pre-defined threshold.

13. The apparatus of claim 8, further comprising:

means for executing an optimization algorithm using the stress profile as parametric input to modify the package layout.

14. The apparatus of claim 13, wherein the optimization algorithm comprises a simulated annealing algorithm.

15. A non-transitory computer readable medium having stored thereon instructions that when executed by a processor cause the processor to perform a method of modeling stress in a packaged semiconductor device, the method comprising:

selecting, using a computer, successive portions of a package layout for the semiconductor device, each of the successive portions of the package layout describing physical layout of at least one interconnect structure in the semiconductor device;

for each portion of the successive portions of the package layout:

(1) selecting a pre-defined layout from a library of pre-defined layouts based on the portion of the package layout, wherein the selecting of the pre-defined layout includes determining the pre-defined layout from the library that matches a number and type of interconnect elements, and a physical position of the interconnect elements of the selected portion;

(2) obtaining, from the library of pre-defined layouts, pre-characterization information for the pre-defined layout that defines structural properties of the pre-defined layout; and (3) executing a modeling algorithm to determine a stress measurement for the portion of the package layout using the pre-characterization information as parametric input; and combining stress measurements for the successive portions of the package layout to determine a stress profile for the semiconductor device.

16. The non-transitory computer readable medium of claim 15, wherein the at least one interconnect structure in each of the successive portions of the package layout includes at least one of: (1) at least one micro-bump; or (2) at least one through-silicon via (TSV).

17. The non-transitory computer readable medium of claim 15, wherein:

the pre-characterization information includes a mesh defining structure of the pre-defined layout; and the modeling algorithm comprises a finite element analysis algorithm configured to use the mesh to determine stress.

18. The non-transitory computer readable medium of claim 15, wherein the method further comprises:

analyzing the stress profile to determine a ranking of interconnect structures in the package layout according to stress; and displaying a graphic user interface (GUI) illustrating the ranking.

19. The non-transitory computer readable medium of claim 18, wherein the method further comprises:

highlighting, within the GUI, at least one interconnect structure in the package layout where stress as determined in the stress profile exceeds a pre-defined threshold.

20. The non-transitory computer readable medium of claim 15, wherein the method further comprises:

executing an optimization algorithm using the stress profile as parametric input to modify the package layout.

* * * * *